United States Patent
Dahlman et al.

(10) Patent No.: US 11,849,419 B2
(45) Date of Patent: Dec. 19, 2023

(54) TIMING CONTROL FOR INTEGRATED ACCESS AND BACKHAUL (IAB) NODE TRANSMISSION

(71) Applicant: Telefonaktiebolaget LM Ericsson (publ), Stockholm (SE)

(72) Inventors: Erik Dahlman, Stockholm (SE); Boris Dortschy, Hägersten (SE); Yezi Huang, Täby (SE); Per-Erik Eriksson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 37 days.

(21) Appl. No.: 17/280,676

(22) PCT Filed: Sep. 27, 2019

(86) PCT No.: PCT/EP2019/076246
§ 371 (c)(1),
(2) Date: Mar. 26, 2021

(87) PCT Pub. No.: WO2020/065037
PCT Pub. Date: Apr. 2, 2020

(65) Prior Publication Data
US 2021/0385776 A1    Dec. 9, 2021

Related U.S. Application Data

(60) Provisional application No. 62/737,706, filed on Sep. 27, 2018.

(51) Int. Cl.
*H04W 56/00* (2009.01)
*H04W 84/18* (2009.01)
(Continued)

(52) U.S. Cl.
CPC ....... *H04W 56/0045* (2013.01); *H04W 40/38* (2013.01); *H04W 56/0065* (2013.01);
(Continued)

(58) Field of Classification Search
None
See application file for complete search history.

(56) References Cited

U.S. PATENT DOCUMENTS

| | | | | |
|---|---|---|---|---|
| 2013/0107793 A1* | 5/2013 | Gan | ..................... | H04W 56/001 370/315 |
| 2014/0016621 A1* | 1/2014 | Zhang | ............... | H04W 56/0055 370/336 |

(Continued)

OTHER PUBLICATIONS

International Search Report and Written Opinion dated Dec. 20, 2021 for International Application No. PCT/EP2019/076246 filed Sep. 27, 2019, consisting of 12-pages.
(Continued)

*Primary Examiner* — San Htun
(74) *Attorney, Agent, or Firm* — Christopher & Weisberg, P.A.

(57) ABSTRACT

A method, system and apparatus are disclosed. In one or more embodiments, a network node configured to communicate with a wireless device (WD) is provided. The network node configured to, and/or including a radio interface and/or including processing circuitry configured to: receive information indicating a timing offset ($T'_A$), determine transmission timing for downlink transmission based on the timing offset ($T'_A$) and at least one estimated timing value, and perform downlink transmission based on the determine transmission timing.

17 Claims, 11 Drawing Sheets

(51) Int. Cl.
*H04W 40/38* (2009.01)
*H04W 80/02* (2009.01)
*H04W 88/14* (2009.01)

(52) U.S. Cl.
CPC .......... *H04W 80/02* (2013.01); *H04W 84/18* (2013.01); *H04W 88/14* (2013.01)

(56) References Cited

U.S. PATENT DOCUMENTS

| | | | | |
|---|---|---|---|---|
| 2015/0215887 | A1* | 7/2015 | Nejatian | H04W 56/0045 370/350 |
| 2016/0345316 | A1* | 11/2016 | Kazmi | H04W 72/0446 |
| 2019/0349871 | A1* | 11/2019 | Ghosh | H04B 7/155 |
| 2019/0386926 | A1* | 12/2019 | Abedini | H04L 47/283 |

OTHER PUBLICATIONS

3GPP TSG RAN WG1 Meeting #94 R1-1808087; Title: On IAB node synchronization and timing alignment; Agenda Item: 7.2.3.3; Source: Huawei, HiSilicon; Document for: Discussion and decision; Date and Location: Aug. 20-24, 2018, Gothenburg, Sweden, consisting of 8-pages.

3GPP TSG RAN WG1 Meeting #93 R1-1807396; Title: Network synchronization for multi-hop IAB; Agenda Item: 7.7.3; Source: Qualcomm Incorporated; Document for: Discussion and decision; Date and Location: May 21-25, 2018, Busan, Korea, consisting of 10-pages.

3GPP TSG RAN WG1 Meeting 93 R1-1806664; Title: IAB synchronization; Agenda Item: 7.7.3; Source: Nokia, Nokia Shanghai Bell; Document for: Discussion and Decision; Date and Location: May 21-25, 2018, Busan, Korea, consisting of 5-pages.

3GPP Tsg Ran WG1 Meeting #94bis R1-1810051; Title: Final Report of 3GPP TSG RAN WG1 #94 v1.0.0 (Gothenburg, Sweden, Aug. 20-24, 2018); Source: MCC Support; Document for: Approval; Location and Date: Chengdu, China, Oct. 8-12, 2018, consisting of 195 pages.

* cited by examiner

TIMING CONTROL FOR INTEGRATED ACCESS AND BACKHAUL (IAB) NODE TRANSMISSION

CROSS-REFERENCE TO RELATED APPLICATIONS

This application is a Submission Under 35 U.S.C. § 371 for U.S. National Stage Patent Application of International Application No.: PCT/EP2019/076246, filed Sep. 27, 2019 entitled "TIMING CONTROL FOR INTEGRATED ACCESS AND BACKHAUL (IAB) NODE TRANSMISSION," which claims priority to U.S. Provisional Application No. 62/737,706, filed Sep. 27, 2018, entitled "TIMING CONTROL FOR INTEGRATED ACCESS AND BACKHAUL (IAB) NODE TRANSMISSION," the entireties of both of which are incorporated herein by reference.

TECHNICAL FIELD

The present disclosure relates to wireless communications, and in particular, to transmission timings for Integrated Access and Backhaul (IAB) communications.

BACKGROUND

In a wireless relay network, some wireless devices connect to the network via relay network nodes. Within the Third Generation Partnership Project (3GPP), the term integrated Access Backhaul (IAB) is used to refer to such a wireless relay network based on the New Radio (NR) (also referred to as 5G) radio-access technology. FIG. 1 includes an IAB network node 1, child IAB network node 2, IAB donor/parent Network node 3 and one or more wireless devices 4. In FIG. 1, an IAB deployment is presented, where the IAB donor network node 3 (in short IAB donor) has a wired connection to the core network and the IAB relay network nodes (in short IAB network nodes 1) are wirelessly connected using NR to the IAB donor 3, either directly or indirectly via another IAB network node 1. The connection between IAB donor/node 3 and wireless devices 4 is called access link, whereas the connection between two IAB network nodes; between an IAB donor 3 and an IAB network node 1; or between an IAB network node 1 and a child node 2 is called backhaul link. For the IAB network, the backhaul links are implemented as NR wireless links.

As shown in FIG. 2, for a given IAB network node (e.g. IAB network node 1) there are six different types of links:

$L_{P,DL}$: The downlink backhaul link from a parent IAB network node 3 (a donor node or another IAB network node) to the IAB network node 1 (transmitted by the parent IAB network node 3, received by the IAB network node 1);

$L_{P,UL}$: The uplink backhaul link from the IAB network node 1 to the parent IAB network node 3 (transmitted by the IAB node 1, received by the parent IAB network node 3);

$L_{C,DL}$: The downlink backhaul link from the IAB network node 1 to a child (IAB) network node 2 (transmitted by the IAB network node 1, received by the child IAB network node 2);

$L_{C,UL}$: The uplink backhaul link from a child IAB network node 2 to the IAB network node 1 (transmitted by the child IAB network node 2, received by the IAB network node 1);

$L_{A,DL}$: The downlink access link to a wireless device 4 served by the IAB network node 1 (transmitted by the IAB network node 1, received by the wireless device 4); and $L_{A,UL}$: The uplink access link from a wireless device 4 served by the IAB network node 1 (transmitted by the wireless device 4, received by the IAB network node 1).

Note that what is a child link ($L_{C,DL/UL}$) for one IAB network node may be a parent link ($L_{P,DL/UL}$) for another IAB network node and vice versa. As an example, assuming that the parent IAB network node 3 is also an IAB network node (like IAB network node 1), the links $L_{P,DL}$ and $L_{P,UL}$ in FIG. 2 are of type $L_{C,DL}$ and $L_{C,UL}$ from the point-of-view of the parent IAB network node 3. Similarly, from the point-of-view of the child IAB network node 2 in FIG. 2, the IAB network node 1 is a parent IAB network node and the links $L_{C,DL}$ and $L_{C,UL}$ are, from the point-of-view of the child IAB network node 2, parent links $L_{P,DL}$ and $L_{P,UL}$. Accordingly, parent IAB network nodes 3 and/or child IAB network nodes 2 may also be IAB network nodes.

One issue is what timing an IAB network node 1 may use for the transmission of the different links in FIG. 2. Note that transmission timing at the IAB network node 1 refers to the timing of the links transmitted from the IAB network node 1, i.e. the transmission timing of links $L_{P,UL}$, $L_{C,DL}$ and $L_{A,DL}$.

It is assumed that the transmission timing of IAB network node 1 uplink transmissions (link $L_{P,UL}$) is controlled by the parent IAB network node 3 in the same way as a base station controls the transmission timing of uplink transmissions from wireless device 4, i.e., by explicit timing control commands provided by, in this case, the parent IAB network node 3 to the IAB network node 1. This control is such that the uplink transmission is received at the base station, or parent node in case of IAB, with an appropriate timing. What is an appropriate timing is a parent-node internal decision. What remains is thus the transmission timing of the downlink links of the IAB network node 1, i.e., the transmission timing of $L_{C,DL}$ and $L_{A,DL}$ of FIG. 2.

The timing variables discussed below are illustrated in and described with reference to FIG. 3.

Current NR specifications state that downlink transmissions from different network nodes may be time-aligned (within a certain allowed maximum error). Assuming that this requirement may be carried over to IAB network nodes 1, this implies that the IAB network node 1 downlink transmissions ($L_{C,DL}$ and $L_{A,DL}$) may be aligned with the transmission timing of link $L_{P,DL}$ at the parent IAB network node 3, here referred to as $T_{P,DL,TX}$. Note that $T_{P,DL,TX}$ is not directly known by the IAB network node 1 which can only directly measure the reception timing of link $L_{P,DL}$, here referred to as $T_{P,DL,RX}$, i.e., the time when $L_{P,DL}$ is received at the IAB network node 1. $T_{P,DL,RX}$ differs from $T_{P,DL,TX}$ by the propagation time $T_{prop}$ from the parent IAB network node 3 to the IAB network node 1, i.e., $T_{P,DL,RX}=T_{P,DL,TX}+T_{prop}$.

Assuming that the parent network node aligns the transmission timing of $L_{P,DL}$ with the reception timing of $L_{P,UL}$, the IAB network node 1 can estimate the propagation time from the parent IAB network node 33 to the IAB network node 1 from the difference in relative timing between the reception of $L_{P,DL}$ ($T_{P,DL,RX}$) and the transmission of $L_{P,UL}$ (here referred to as $T_{P,UL,TX}$). More specifically, the propagation time can be estimated as $T_{prop,est}=T_A/2=(T_{P,DL,RX}-T_{P,UL,TX})/2$.

This estimate of the propagation time can then be used, in combination with the estimated timing of the downlink reception at the IAB network node 1 ($T_{P,DL,RX}$) to determine the timing of the downlink transmissions from the IAB network node 1 (transmission of $L_{C,DL}$ and $L_{A,DL}$), here referred to as $T_{C/A,DL,TX}$ according to $T_{C/A,DL,TX} = T_{P,DL,RX} - T_{prop,est}$. These timings are illustrated in FIG. 3.

Thus, when it is assumed that there is no timing offset at the parent IAB network node 3 between the transmission timing of $L_{P,DL}$ and the reception timing of $L_{P,UL}$, the IAB network node 1 can determine its downlink transmission timings from the estimated timing of the downlink reception of $L_{P,DL}$ and an estimate of the propagation time from the parent IAB network node 3 to the IAB network node 1. However, in practice, there might be a time offset at the parent node between the reception timing of $L_{P,UL}$ and transmission timing of $L_{P,DL}$, denoted $T_A$. This time offset might arise, for example, from the time to allow receiver/transmitter switching at the parent IAB network node 3, or due to other constraints on the uplink reception timing. This time offset between the downlink transmission timing and uplink reception timing is illustrated in FIG. 4. It is noted that, in general, the time offset may be positive or negative.

The presence of a timing offset $T_A$ means the difference between the downlink reception timing and the uplink transmission timing can no longer be used directly to derive a good estimate of the propagation time and, therefore, to derive suitable downlink transmission timing for the IAB network node 1. For example, the case that there is no timing offset between the transmission timing of $L_{P,DL}$ with the reception timing of $T_A = 0$, then $T_A = 2*T_{prop}$ as illustrated in FIG. 3. Since the IAB network node 1 can estimate the timing of the downlink reception $T_{P,DL,RX}$ or (DL RX ($L_{P,DL}$)) and the timing of the uplink transmission at the IAB network node 1 (UL TX ($L_{P,UL}$)), the IAB network node 1 can calculate $T_A$, and hence $T_{prop}$. $T_A$ may be known to the IAB network node 1 as its (mobile termination (MT)) uplink timing can be controlled by TA commands. However, with reference to FIG. 4, when $T_\Delta \neq 0$, $T_A = 2*T_{prop} + T_\Delta$. In this case, while the IAB network node 1 can determine (e.g. by calculating or measuring) $T_A$ as discussed above, there are now two unknowns to the IAB network node: $T_{prop}$ and $T_\Delta$. Therefore, the IAB network node 1 may be unable to derive suitable downlink transmission timing.

SUMMARY

Some embodiments advantageously provide methods, systems, and apparatuses for transmission timings for Integrated Access and Backhaul (IAB) communications.

According to one or more embodiments, the IAB node is provided with an offset $T'_\Delta$. The IAB network node uses this time offset together with the determined (e.g. measured or calculated) relative uplink time alignment at the IAB network node to determine the timing to use for the IAB network node downlink transmissions to child nodes and wireless devices. Note that there is a ' (prime) on the $T'_\Delta$.

According to one aspect of the disclosure, an integrated access backhaul (IAB) network node is provided. The IAB network node includes processing circuitry configured to: receive information indicating a timing offset, determine transmission timing for downlink transmission based at least in part on the timing offset, and perform downlink transmission using the determined transmission timing.

According to one or more embodiments of this aspect, the processing circuitry is configured to determine the transmission timing for downlink transmission based on the timing offset and at least one timing estimate for the IAB network node. According to one or more embodiments of this aspect, the at least one timing estimate comprises an estimate of a timing difference between downlink transmissions received by the IAB network node and uplink transmission transmitted by the IAB network node. According to one or more embodiments of this aspect, the at least one timing estimate comprises an estimate of a reception timing of a downlink backhaul link from a parent IAB network node.

According to one or more embodiments of this aspect, the processing circuitry is configured to receive the information indicating the timing offset via Radio Resource Control, RRC, signaling. According to one or more embodiments of this aspect, the processing circuitry is configured to receive the information indicating the timing offset via Medium Access Control, MAC, signaling. According to one or more embodiments of this aspect, the determined transmission timing for downlink transmission is equal to:

$$T_{P,DL,RX} - (T_A - T_\Delta)/2$$

where $T_{P,DL,RX}$ is a reception timing of downlink transmission from a parent network node, $T_A$ is a timing difference between downlink transmissions received by the IAB network node and uplink transmission transmitted by the IAB network node, and $T_\Delta$ is the timing offset. According to one or more embodiments of this aspect, the processing circuitry is configured to receive the information indicating the timing offset via one of: broadcast signaling; and network node specific signaling.

According to one or more embodiments of this aspect, the timing offset is based at least in part on an offset, at a parent network node, between a downlink transmission to the IAB network node and uplink reception from the IAB network node. According to one or more embodiments of this aspect, the processing circuitry is configured to receive the information indicating the timing offset provided from a parent IAB network node.

According to another aspect of the disclosure, a method implemented by an integrated access backhaul (IAB) network node is provided. Information indicating a timing offset is received. Transmission timing for downlink transmission is determined based at least in part on the timing offset. Downlink transmission is performed using the determined transmission timing.

According to one or more embodiments of this aspect, the transmission timing for downlink transmission is determined based on the timing offset and at least one timing estimate for the IAB network node. According to one or more embodiments of this aspect, the at least one timing estimate comprises an estimate of a timing difference between downlink transmissions received by the IAB network node and uplink transmission transmitted by the IAB network node. According to one or more embodiments of this aspect, the at least one timing estimate comprises an estimate of a reception timing of a downlink backhaul link from a parent IAB network node.

According to one or more embodiments of this aspect, the information indicating the timing offset is received via Radio Resource Control, RRC, signaling. According to one or more embodiments of this aspect, the information indicating the timing offset is received via Medium Access Control, MAC, signaling. According to one or more embodiments of this aspect, the determined transmission timing for downlink transmission is equal to:

$$T_{P,DL,RX} - (T_A - T_\Delta)/2$$

where $T_{P,DL,RX}$ is a reception timing of downlink transmission from a parent network node, $T_A$ is a timing difference between downlink transmissions received by the IAB network node and uplink transmission transmitted by the IAB network node, and $T_A$ is the timing offset.

According to one or more embodiments of this aspect, the information indicating the timing offset is received via one of: broadcast signaling; and network node specific signaling. According to one or more embodiments of this aspect, the timing offset is based at least in part on an offset, at a parent network node, between a downlink transmission to the IAB network node and uplink reception from the IAB network node. According to one or more embodiments of this aspect, the received information indicating the timing offset is provided from a parent IAB network node.

According to another aspect of the disclosure, a computer readable medium is provided. The computer readable medium includes instructions which, when executed by a processor of an integrated access backhaul (IAB) network node, cause the processor to: receive information indicating a timing offset, determine transmission timing for downlink transmission based at least in part on the timing offset, and perform downlink transmission using the determined transmission timing.

According to one or more embodiments of this aspect, the information indicating the timing offset is received via one of Radio Resource Control, RRC, signaling and Medium Access Control, MAC, signaling.

According to another aspect of the disclosure, a parent integrated access backhaul (IAB) network node is provided. The parent IAB network node includes circuitry configured to: determine a timing offset value, and communicate information indicating the timing offset value to an integrated access backhaul (IAB) network node as described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 3:
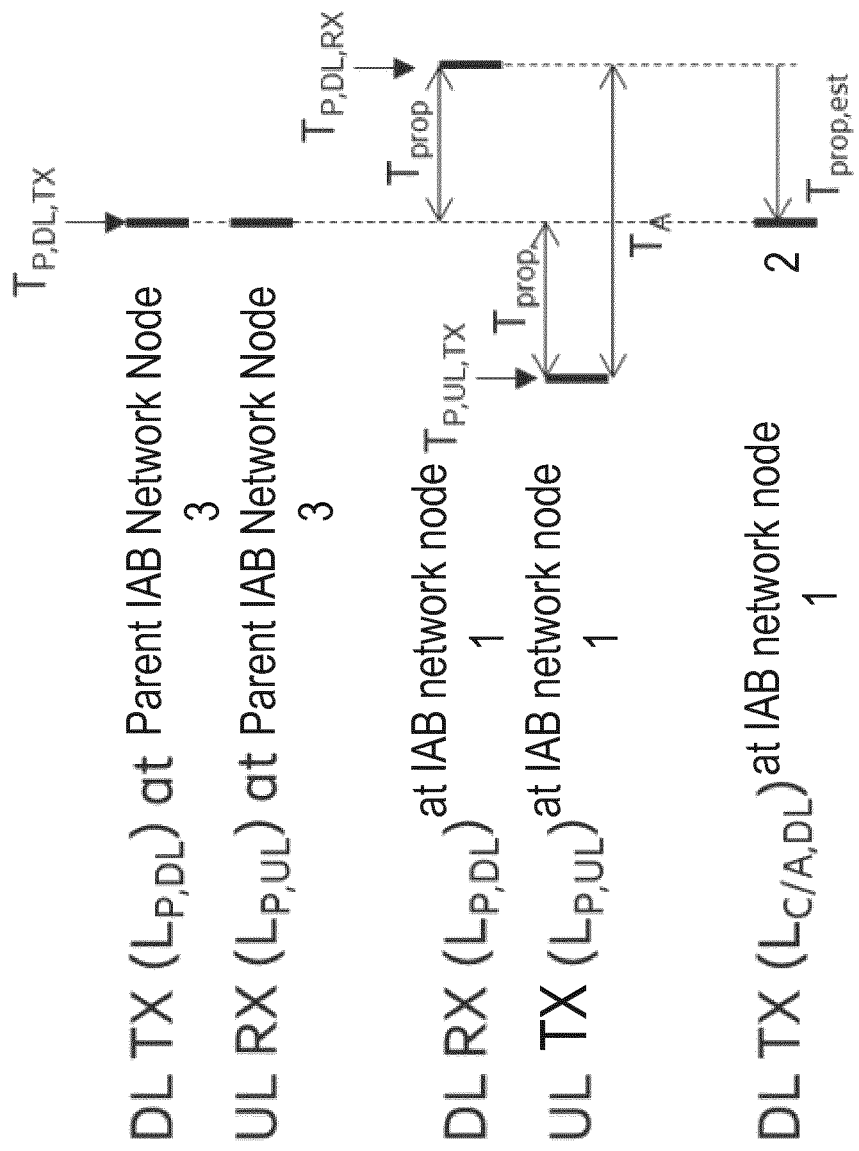
FIG. 3 is a diagram of several timings in the IAB network.

As discussed above, FIG. 3 illustrates various timings within an IAB network. In the scenario illustrated in FIG. 3, the IAB network node 1 can determine its downlink transmission timing from the downlink reception timing in combination with the timing difference between the downlink reception and uplink transmission, assuming that parent IAB network node 3 aligns its downlink transmission (transmission of $L_{P,DL}$) with the uplink reception (reception of $L_{P,UL}$).

However, in practice, uplink reception may not be perfectly aligned with the downlink transmission.

There may, as a minimum, be sometime between the end of an uplink reception and start of downlink transmission to allow for receiver/transmitter switching at the parent IAB network node 3.

Figure 1:
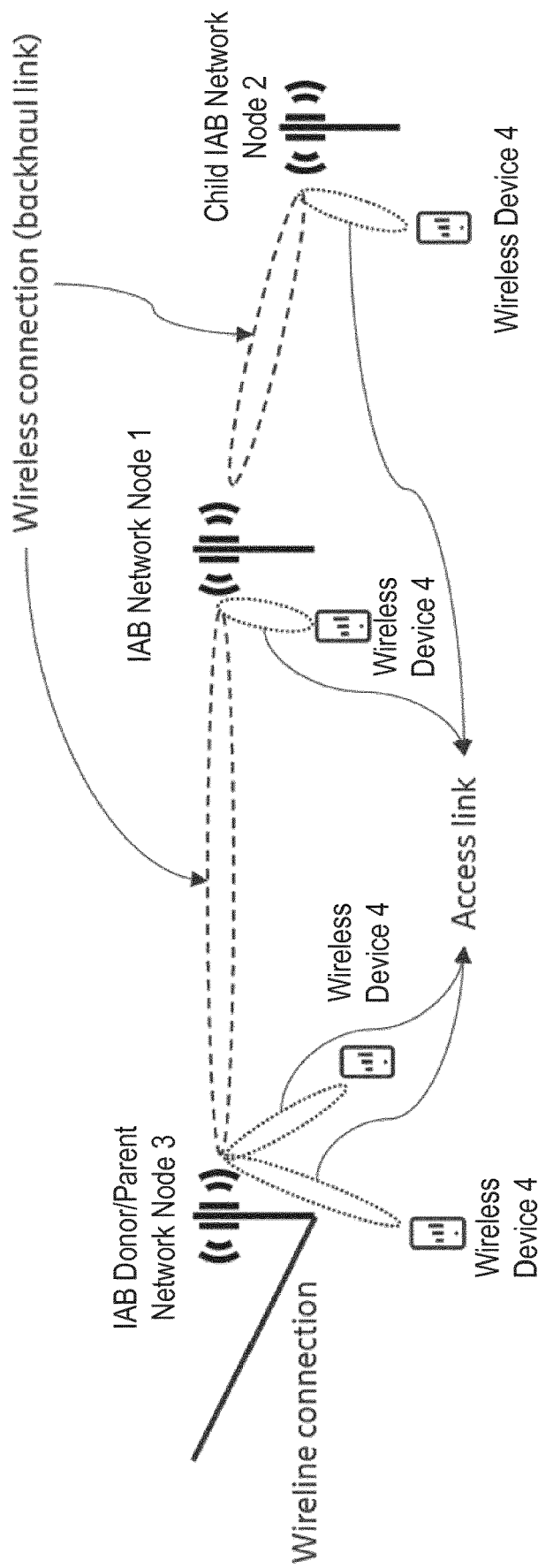
FIG. 1 is a diagram of a multi-hop deployment in an integrated access and backhaul (IAB) network.
Figure 2:
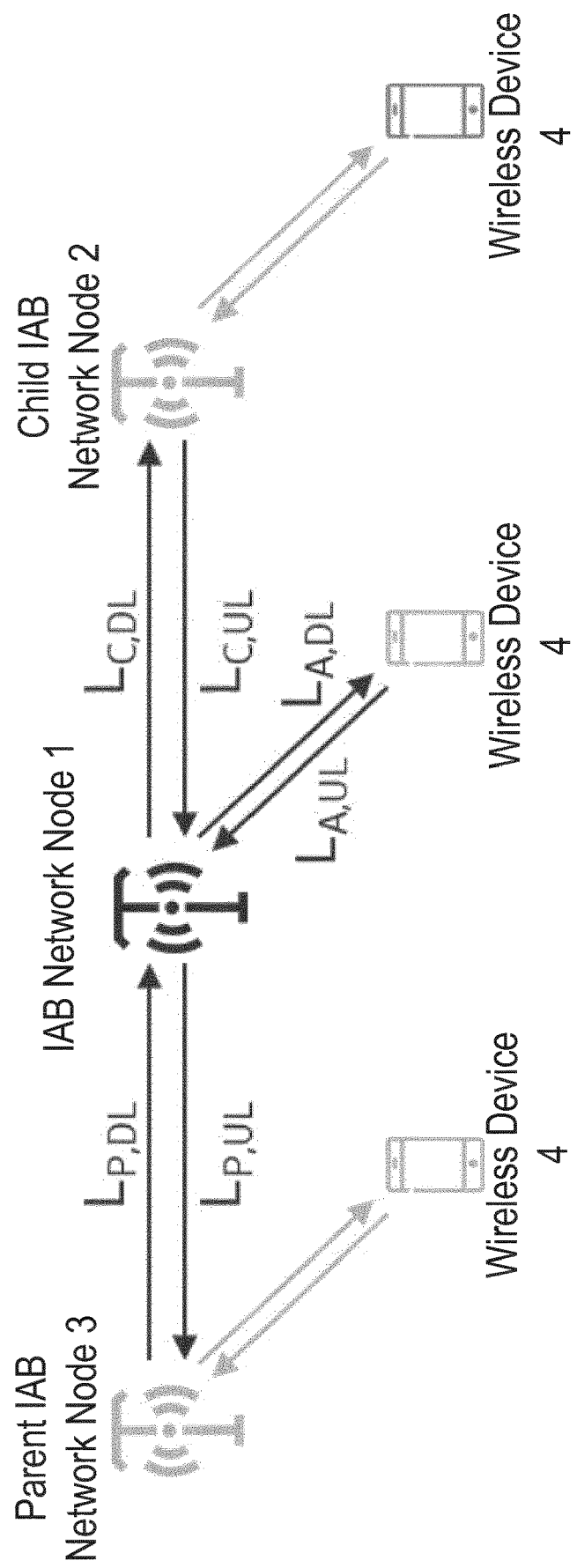
FIG. 2 is a diagram illustrating different link types within the IAB network.

There may be other constraints on the uplink reception timing. The parent IAB network node 3 may, for example, want to align the uplink reception timing with the downlink reception timing, i.e., the timing of signals received by the parent IAB network node 3 from parent's IAB network node (i.e., from the "grandparent" of the IAB network node 1 of FIG. 2).

Figure 4:
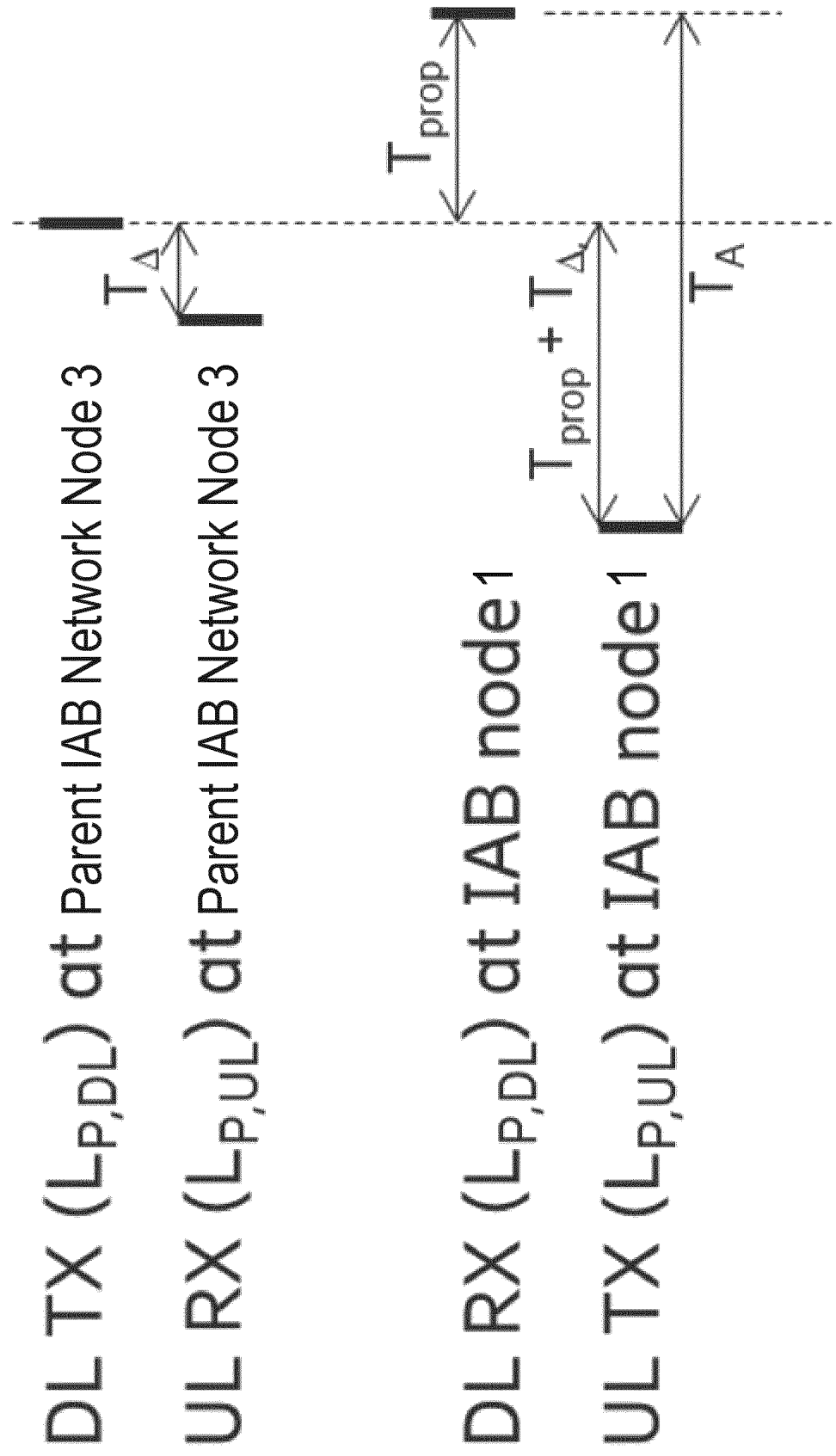
FIG. 4 is a diagram of several timings in the IAB network including an offset between downlink transmission and uplink transmission at a parent IAB network node.

Thus, in the general case, there will be an offset $T_A$ between the downlink transmission and uplink reception at the parent IAB network node 3, as illustrated in FIG. 4. Note that this offset can, in the general, case, be either negative or positive. The parent IAB network node 3 achieves this offset by adjusting the IAB network node 1 uplink transmission timing, using timing-alignment commands, so that the uplink is received at the parent IAB network node 3 with the desired timing. In practice, the IAB network node 1 uplink transmission may then be adjusted by $T_A$ relative to the timing outlined in FIG. 3 and/or FIG. 4. However, by doing so, the difference between the downlink reception timing and the uplink transmission timing at the IAB network node 1 can no longer be used directly to derive a good estimate of the propagation time and, eventually to derive suitable downlink transmission timing for the IAB network node 1, as described above.

There is thus a need for an extended method to determine the downlink transmission timing of an IAB network node even though the parent IAB network node does not align its uplink reception with its downlink transmission.

The teachings of the disclosure advantageously solve at least a portion of the problems with existing systems by providing the IAB network node with an offset $T'_A$. The IAB network node uses this time offset together with the measured relative uplink time alignment at the IAB network node to determine the timing to use for the IAB network node downlink transmissions to child nodes and wireless devices. Note that there is a ' (prime) on the $T'_A$. As used herein, in one or more embodiments, $T_A$ may equal to $T'_A$, and in some other embodiments, $T_A$ may not equal $T'_A$. For example, $T'_A$ corresponds to a time difference targeted by a parent IAB network node where the time difference is between the parent IAB network node's DL TX and UL RX. $T'_A$ corresponds to what time offset the parent IAB network node provides and/or IAB network node receives to, for example, eventually use for DL Tx timing determination at the IAB network node. In other words, in general, one IAB network (parent) node provides information indicating a timing offset and another node (IAB-node) receives information about a timing offset and uses it for making a timing determination. Therefore, in some embodiments, $T'_A$ is a timing offset applied at the IAB network node side and $T_A$ is the timing offset provided by the parent IAB network node. In some cases, $T'_A$ equals the timing offset $T_A$ at the parent IAB network node side. In some embodiments where $T_A$ does not equal to $T'_A$, the parent IAB network node may signal $T_A+x$ where x is a compensating factor such as for granularity errors in the system that the parent IAB network node knows about. In this case, $T'_A=T_A+x$. In some embodiments where $T_A$ does not equal to $T'_A$, the parent IAB network node may send, provide and/or indicate $-T_A/2$ to the IAB network node. In this case, $T'_A=-T_A/2$.

Further, teachings of the disclosure provide a way for the IAB network node to determine its timing while keeping flexibility for the parent network node in terms of the receiver timing of signals received at the uplink from the IAB network node. This flexibility, for example, allows for the parent network node to align the uplink receiver timing with the downlink receiver timing enabling orthogonality and FDM/SDM multiplexing of these links.

Before describing in detail exemplary embodiments, it is noted that the embodiments reside primarily in combinations of apparatus components and processing steps related to transmission timings for Integrated Access and Backhaul (IAB) communications. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this may not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

The term time resource used herein may correspond to any type of physical resource or radio resource expressed in terms of length of time. Examples of time resources are: symbol, time slot, subframe, radio frame, TTI, interleaving time, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments described herein provide transmission timings for Integrated Access and Backhaul (IAB) communications, and in particular, for communicating and using timing offset $T'_A$ for performing transmissions.

Figure 5:
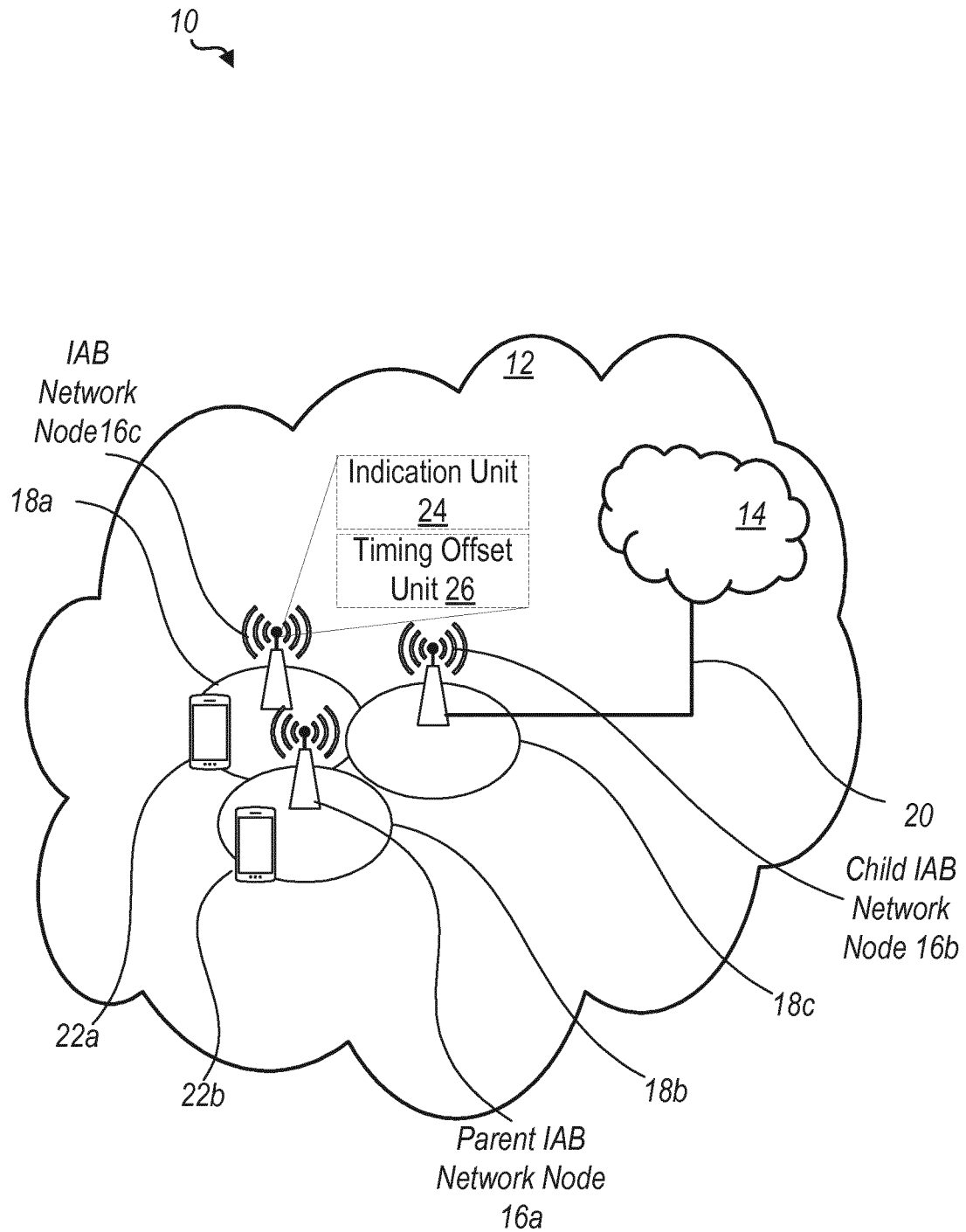
FIG. 5 is a schematic diagram of an exemplary network architecture according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes such as parent IAB network node 16a, child IAB network node 16b, IAB network node 16c (referred to collectively as IAB network nodes 16), such as NBs, eNBs, gNBs or other types of wireless access points, each defining a corresponding coverage area 18a, 18b, 18c (referred to collectively as coverage areas 18). As used herein, IAB network node 16c may refer to one or more IAB network nodes. Each IAB network node 16a, 16b, 16c is connectable to the core network 14 over a wired or wireless connection 20. A first wireless device (WD) 22a located in coverage area 18a is configured to wirelessly connect to, or be paged by, the corresponding IAB network node 16c. A second WD 22b in coverage area 18b is wirelessly connectable to the corresponding parent IAB network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three IAB network nodes 16 are shown for convenience, the communication system may include many more WDs 22 and IAB network nodes 16.

Also, it is contemplated that a WD 22 can be in simultaneous communication and/or configured to separately communicate with more than one IAB network node 16 and more than one type of IAB network node 16. For example, a WD 22 can have dual connectivity with a IAB network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer, which may be embodied in the hardware and/or software of a standalone server, a cloud-implemented server, a distributed server or as processing resources in a server farm.

In some embodiments an IAB network node 16c is configured to include an indication unit 24 which is configured to provide information indicating a timing offset for deriving transmission timing based on the timing offset (T'A) and at least one estimated timing value (e.g. if the network node 16c also functions as a parent IAB network node to at least one other IAB network node within the network). In some embodiments, an IAB network node 16c is configured to include a timing offset unit 26 which is configured to perform transmissions based on a determined transmission timing.

Example implementations, in accordance with an embodiment, of IAB network node 16c discussed in the preceding paragraphs will now be described with reference to FIG. 6. In a communication system 10, IAB network node 16c is provided in a communication system 10 and includes hardware 28 enabling it to communicate with the WD 22 and other IAB network nodes 16. The hardware 28 may include a communication interface 30 for setting up and maintaining a wired or wireless connection with an interface of another communication device of the communication system 10 such a to communicate over a backhaul network with another IAB network node 16, as well as a radio interface 32 for setting up and maintaining at least a wireless connection with a WD 22 located in a coverage area 18 served by the IAB network node 16c. The radio interface 32 may be formed as or may include, for example, one or more RF transmitters, one or more RF receivers, and/or one or more RF transceivers. The communication interface 30 may be configured to facilitate a connection 36 such as a backhaul connection with/to one or more IAB network nodes 16, among other entities in communication system 10.

In the embodiment shown, the hardware 28 of the IAB network node 16c further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the IAB network node 16c further has software 44 stored internally in, for example, memory 42, or stored in external memory (e.g., database, storage array, network storage device, etc.) accessible by the IAB network node 16c via an external connection. The software 44 may be executable by the processing circuitry 38. The processing circuitry 68 may be configured to control any of the methods and/or processes described herein and/or to cause such methods, and/or processes to be performed, e.g., by IAB network node 16c. Processor 40 corresponds to one or more processors 40 for performing IAB network node 16c functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to IAB network node 16c. For example, processing circuitry 38 of the IAB network node 16c may include an indication unit 24 for providing information indicating a timing offset for deriving transmission timing based on the timing offset (T'A) and at least one estimated timing value. The processing circuitry 38 may also include timing offset unit 26 which is configured to perform transmissions based on a determined transmission timing. In one or more embodiments, non-IAB network nodes may correspond to hardware and software described with respect to IAB network node 16c but with at least indication unit 24 and timing offset unit 26 omitted.

The communication system 10 further includes the WD 22 already referred to. In some embodiments, the inner workings of the IAB network node 16c may be as shown in FIG. 6 and independently, the surrounding network topology may be that of FIG. 5.

Figure 6:
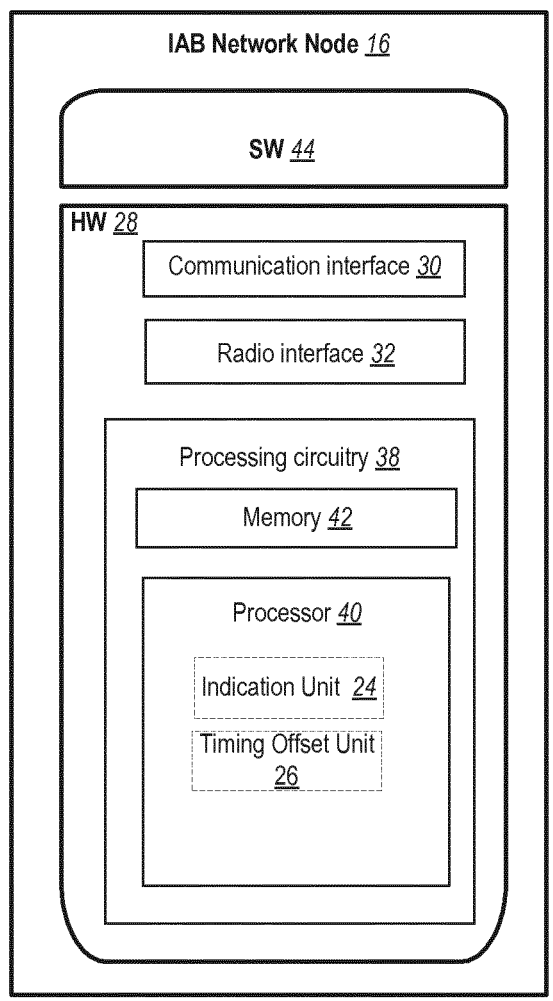
FIG. 6 is a block diagram of network nodes according to some embodiments of the present disclosure.

Although FIGS. 5 and 6 show various "units" such as indication unit 24, and timing offset unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry. Further, whether indication unit 24 and/or timing offset unit 26 are included and/or activated in respective network nodes 16 may depend on whether IAB network node 16 is an IAB network node 16c, for example. Hence, indication unit 24 and/or timing offset unit 26 may be optional in one or more IAB network nodes 16.

Figure 7:
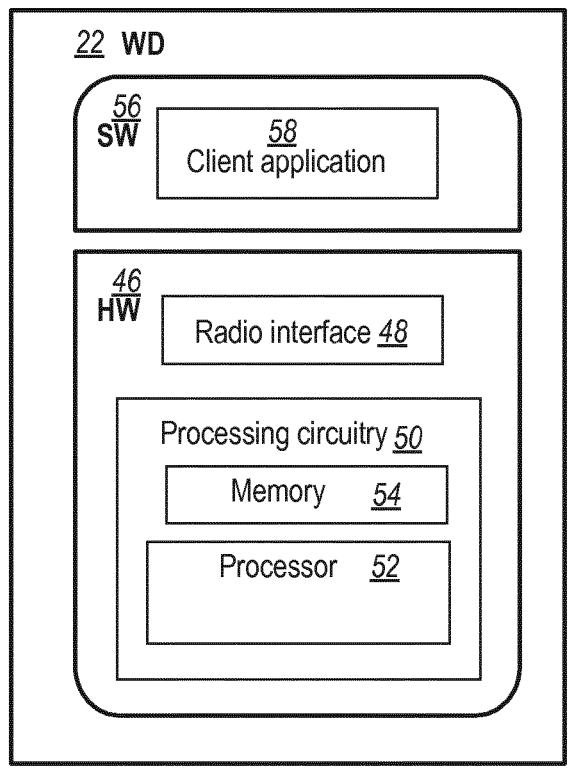
FIG. 7 is a block diagram of wireless device according to some embodiments of the present disclosure.

FIG. 7 is a diagram of a wireless device 22 that is in communication with IAB network node 16 and/or other entities in the communication network. The WD 22 may have hardware 46 that may include a radio interface 48 configured to set up and maintain a wireless connection with a IAB network node 16 serving a coverage area in which the WD 22 is currently located. The radio interface 48 may be formed as or may include, for example, one or more RF transmitters, one or more RF receivers, and/or one or more RF transceivers.

The hardware 46 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22. The client application 58 may interact with the user to generate the user data that it provides.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein and/or other processes with respect to WD 22.

Figure 8:
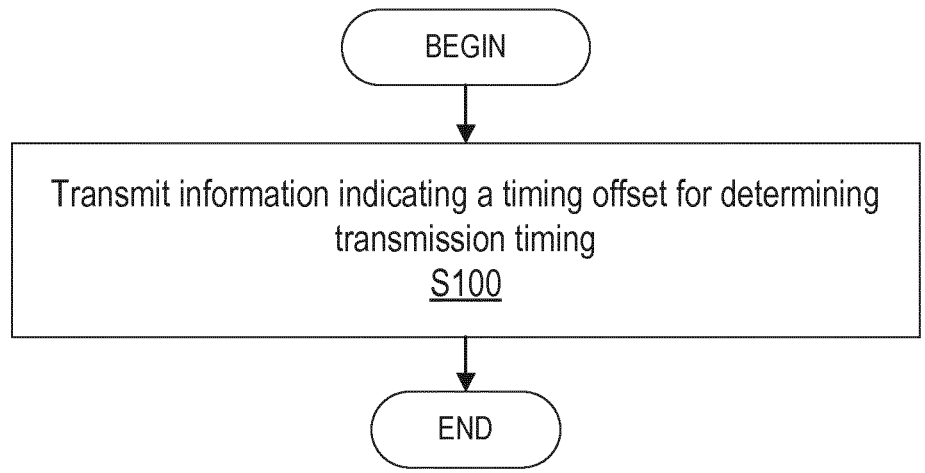
FIG. 8 is a flowchart of an exemplary process in a network node for communicating a timing offset for Integrated Access and Backhaul communications according to some embodiments of the present disclosure.

FIG. 8 is a flowchart of an exemplary process performed by the IAB network node 16c for providing information indicating a timing offset for deriving transmission timing based on the timing offset (T'A) and at least one estimated timing value (e.g. if network node 16c is acting as a parent IAB network node to another IAB network node). One or more Blocks described herein may be performed by one or more elements of IAB network node 16c such as by processing circuitry 38, communication interface 30, radio interface 32, etc. IAB network node 16c is configured to communicate, such as via communication interface 30 and/or radio interface 32, (Block S100) information indicating a timing offset ($T_A$) for determining transmission timing based on the timing offset ($T'_A$) and at least one estimated timing value, as described herein. In one or more embodiments, the at least one estimated timing value includes an estimate of a timing difference ($T_A$) between downlink transmissions received by the network node and uplink transmission transmitted by the network node. In one or more embodiments, the at least one estimated timing value includes an estimate of a reception timing of a downlink backhaul link from a parent network node ($T_{P,DL,RX}$).

Figure 9:
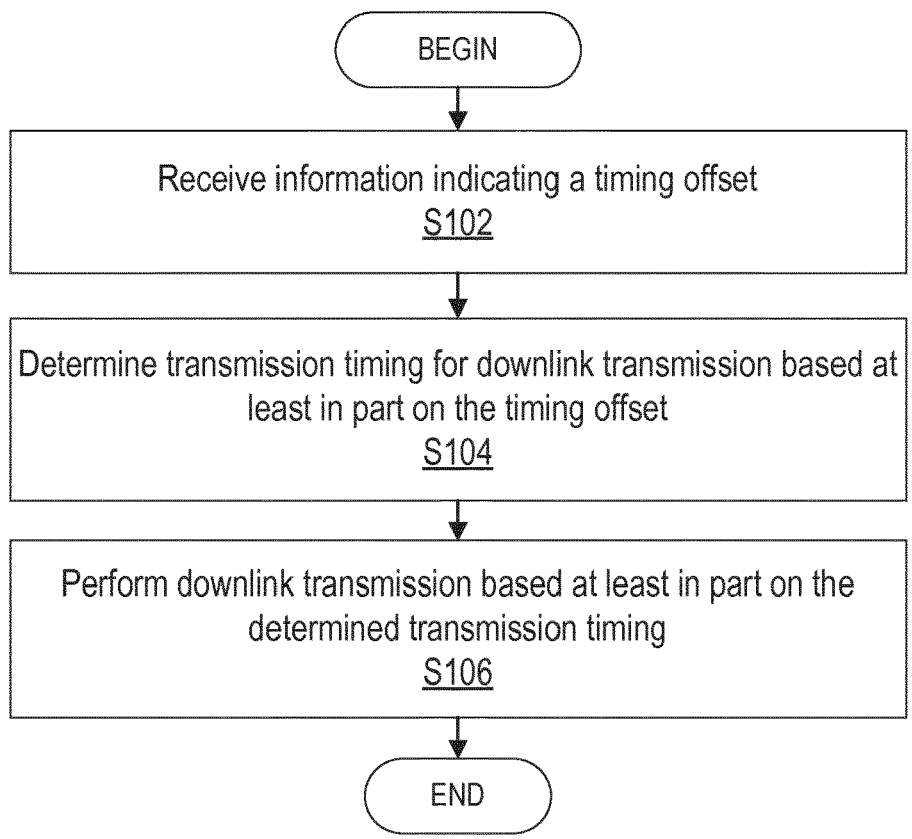
FIG. 9 is a flowchart of an exemplary process in a network node for determining transmission timings for Integrated Access and Backhaul communications according to some embodiments of the present disclosure.

FIG. 9 is a flowchart of an exemplary process performed by IAB network node 16c for performing transmissions based on a determined transmission timing according to some embodiments of the present disclosure. One or more Blocks described herein may be performed by one or more elements of IAB network node 16c such as by processing circuitry 38, communication interface 30, radio interface 32, etc. IAB network node 16c, such as via communication interface 30 and/or radio interface 32, is configured to receive (Block S102) information indicating a timing offset ($T'_A$), as described herein. IAB network node 16c is configured to determine (Block S104) transmission timing for downlink transmission based on the timing offset ($T'_A$) and at least one estimated timing value. Block S104 may for example be performed by the timing offset unit 26. IAB network node 16c is configured to perform (Block S106) downlink transmission based on the determine transmission timing.

In one or more embodiments, the at least one estimated timing value (i.e., timing estimate) includes an estimate of a timing difference ($T_A$) between downlink transmissions received by the IAB network node 16c and uplink transmission transmitted by the IAB network node 16c. In one or more embodiments, the at least one estimated timing value (i.e., timing estimate) includes an estimate of a reception timing of a downlink backhaul link from a parent IAB network node 16a (denoted $T_{P,DL,RX}$). According to one or more embodiments, the processing circuitry 38 is configured to determine the transmission timing for downlink transmission based on the timing offset and at least one timing estimate for the IAB network node 16c.

According to one or more embodiments, the processing circuitry 38 is configured to receive the information indicating the timing offset via Radio Resource Control, RRC, signaling. According to one or more embodiments, the processing circuitry 38 is configured to receive the information indicating the timing offset via Medium Access Control, MAC, signaling. According to one or more embodiments, the determined transmission timing for downlink transmission is equal to:

$$T_{P,DL,RX} - (T_A - T_\Delta)/2$$

where $T_{P,DL,RX}$ is a reception timing of downlink transmission from a parent network node, $T_A$ is a timing difference between downlink transmissions received by the IAB network node and uplink transmission transmitted by the IAB network node, and $T\Delta$ is the timing offset.

According to one or more embodiments, the processing circuitry 38 is configured to receive the information indicating the timing offset via one of: broadcast signaling, and network node specific signaling. According to one or more embodiments, the timing offset is based at least in part on an offset, at a parent IAB network node 16a, between a downlink transmission to the IAB network node 16c and uplink reception from the IAB network node 16c. According to one or more embodiments, the processing circuitry 38 is configured to receive the information indicating the timing offset provided from a parent IAB network node 16a.

Figure 10:
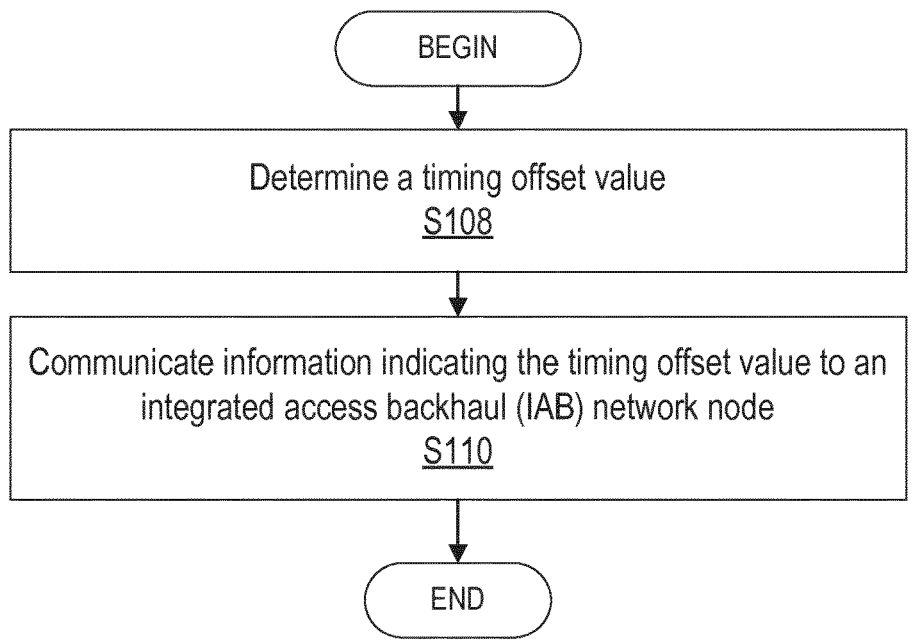
FIG. 10 is a flowchart of an exemplary process of a parent IAB network node according to some embodiments of the present disclosure.

FIG. 10 is a flowchart of another exemplary process implemented by parent IAB network node 16 according to some embodiments of the present disclosure. One or more Blocks and/or functions performed by IAB network node 16 may be performed by one or more elements of IAB network node 16 such as by indication unit 24 in processing circuitry 38, processor 40, radio interface 32, etc. In one or more embodiments, IAB network node 16 such as via one or more of processing circuitry 38, processor 40, communication interface 30 and radio interface 32 is configured to determine (Block S108) a timing offset value, ($T_\Delta$), as described herein. In one or more embodiments, IAB network node 16 such as via one or more of processing circuitry 38, processor 40, communication interface 30 and radio interface 32 is configured to communicate (Block S110) information indicating the timing offset value $T_\Delta$ to an integrated access backhaul (IAB) network node as described herein such as with respect to IAB network node 16c.

Further, in one or more embodiments, a computer readable medium such as memory 42 includes instructions which, when executed by a processor 40 of IAB network node 16, cause the processor 40 to: receive information indicating a timing offset, determine transmission timing for downlink transmission based at least in part on the timing offset, and perform downlink transmission using the determined transmission timing. According to one or more embodiments, the information indicating the timing offset is received via one of Radio Resource Control, RRC, signaling and Medium Access Control, MAC, signaling.

In one or more embodiments, a parent IAB network node 16 such as parent IAB network node 16a includes processing circuitry 38 configured determine a timing offset value, and communicate information indicating the timing offset value to an IAB network node 16 as described herein.

Having generally described arrangements for transmission timings for Integrated Access and Backhaul (IAB) communications, details for these arrangements, functions and processes are provided as follows, and which may be implemented by the IAB network node 16c and/or wireless device 22.

Embodiments provide for using transmission timings for Integrated Access and Backhaul (IAB) communications.

As described above and illustrated in FIG. 4, in the general case there may be a timing offset $T_\Delta$ between the downlink transmission timing (timing of $L_{P,DL}$ transmission, $T_{P,DL,TX}$) and uplink reception timing (timing of $L_{P,UL}$ reception, $T_{P,UL,RX}$) at the parent IAB network node 16a.

According to one or more embodiments, the parent IAB network node 16a provides information about this timing offset $T_\Delta$ to all IAB networks nodes that are child IAB network nodes of the parent IAB network node 16a (e.g. network node 16c) such as by using broadcast signaling. The use of broadcast signaling may be advantageous since, in a typical case, the parent IAB network node 16a would use the same timing offset $T_\Delta$ for all IAB network nodes 16c for which it is the parent.

According to one or more embodiments, the parent IAB network node 16a provides information about the timing offset $T_\Delta$ to IAB network nodes that are child IAB network nodes of the parent IAB network node 16a (e.g. network node 16c) such as by using dedicated signaling specific for each IAB network node 16c. The use of dedicated signaling allows for the parent IAB network node 16a to apply different offsets for different IAB network nodes 16c.

In one or more embodiments, IAB network node 16c receives information about a time offset T'A from the parent IAB network node 16a. The IAB network node 16c then uses this time offset, together with
- estimates of the timing difference ($T_A$) between the downlink received by the IAB network node 16c and the uplink transmitted by the IAB network node 16c, and
- estimates of the downlink reception timing $T_{P,DL,RX}$ to derive the transmission timing $T_{C/A,DL,TX}$ for downlink transmissions from the IAB network node 16c.

In one or more embodiments, the IAB network node 16c determines the timing of the downlink transmissions as $T_{C/A,DL,TX}=T_{P,DL,RX}-(T_A-T'_A)/2$. The timing difference $T_A$ may be expressed as $T_A=T_{P,DL,RX}-T_{P,UL,TX}$, where $T_{P,DL,RX}$ is the reception timing of the downlink transmitted by the parent IAB network node 16a, and $T_{P,UL,TX}$ is the transmission timing of the uplink from the IAB network node 16c to the parent IAB network node 16a.

Figure 11:
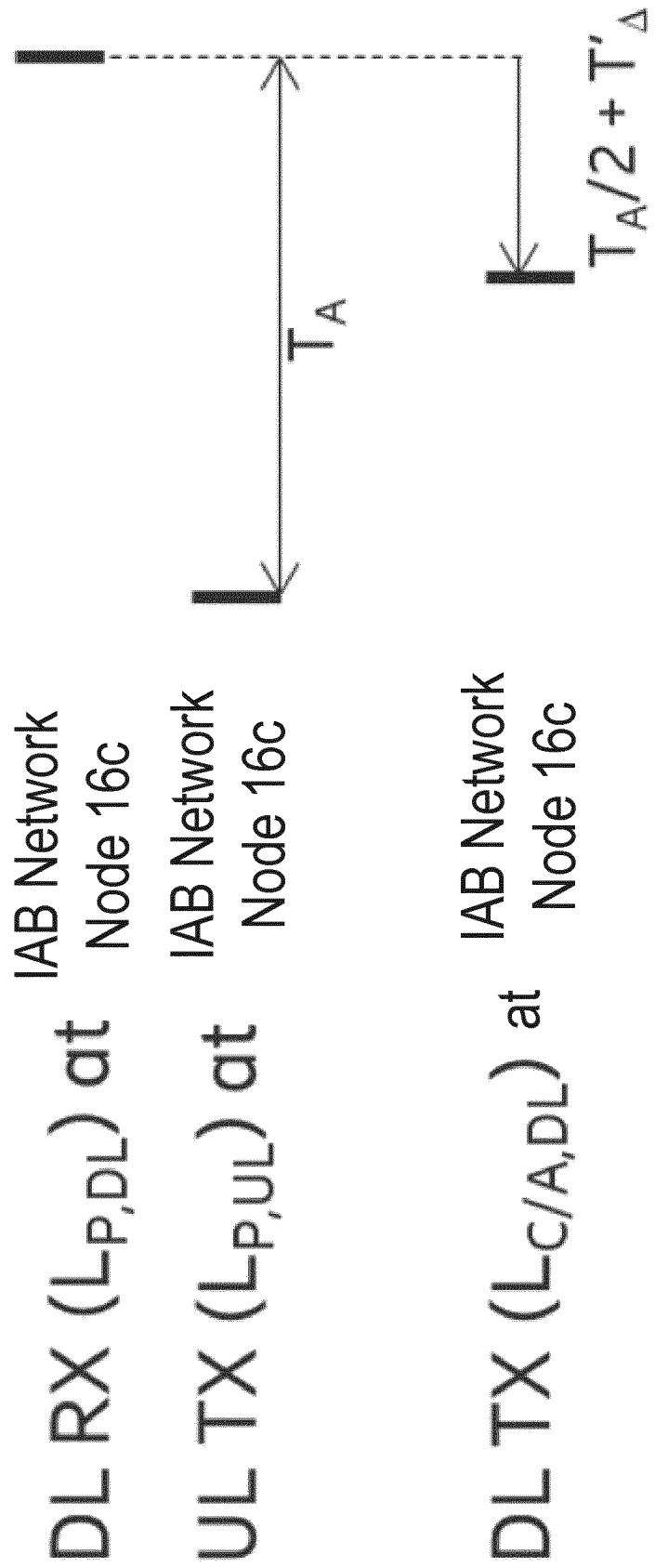
FIG. 11 is a diagram of timing values including the timing offset (T'A) according to some embodiments of the present disclosure.

This is illustrated in FIG. 11. Note that the offset $T'_A$ is the offset applied at the IAB network node 16c side, and $T_A$ the offset determined at the parent IAB network node 16a side. In one or more embodiments, the offset $T'_A$ may be equal to the offset $T_A$ (without the prime) at the parent IAB network node 16a side as illustrated in FIG. 4. In one or more embodiments, the offset in FIG. 11 is an offset provided by the parent IAB network node 16a. In one or more embodiments, offset $T'_A$ may be determined based on one or more characteristics of the IAB network such as timing difference $T_A$ or one and/or more other timings, among other timing characteristics of the IAB network. In one or more embodiments, the determined transmission timing for downlink transmission is equal to $T_{P,DL,RX}-(T_A/2+T'_A)$, where $T'_A$ is the signaled timing offset from the parent IAB network node 16a. Also note that, in the general case, the offset $T'_A$ can be either positive or negative. In some embodiments where $T_A$ does not equal to $T'_A$, the parent IAB network node 16a may send, provide and/or indicate $-T_A/2$ to the IAB network node 16c. In this case, $T'_A=-T_A/2$.

Figure 12:
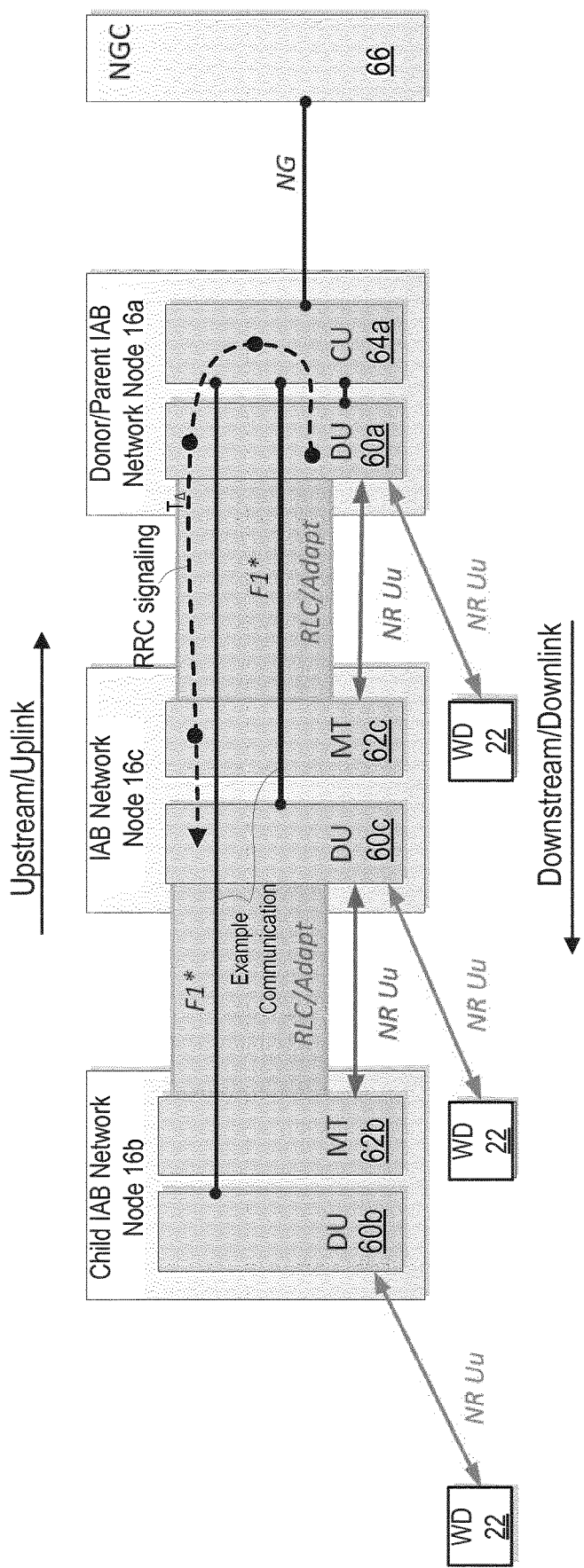
FIG. 12 is a diagram of exemplary RRC signaling according to some embodiments of the present disclosure.

FIG. 12 is a diagram of example RRC signaling for communicating information such as a time offset $T_A$ from a parent IAB network node 16a to IAB network node 16c according to some embodiments of the present disclosure. In particular, child IAB node 16b and IAB network node 16c each include a distributed unit (DU) 60 and a mobile termination (MT) 62, whose functions are well known in the art. For example, child IAB network node 16b includes DU 60b and MT 62b while IAB network node 16c includes DU 60c and MT 62c. Further, parent IAB network node 16a may include DU 60a and central unit (CU) 64a, whose functions are well known in the art. For example, via the MT 62, an IAB network node 16 may communicate with an upstream IAB network node 16. Via DU 60, IAB network node 16 may establish RLC channels to wireless devices 22 and to MTs 62 of downstream IAB network node 16. Further, CU 64a of parent IAB network node 16a may be configured to communicate with 5th Generation Next Gen Core (NGC) 66 as is well known in the art.

The present disclosure adds to this existing system configuration at least by configuring IAB network nodes 16 to communicate information indicating a time offset $T_A$ via radio resource control (RRC) signaling. For example, the information such as information indicating a time offset may be communicated via RRC signaling from DU 60a to CU 64a that then communicates the information to the DU 60a for transmission to the IAB network node 16c. For example, DU 60a, after receiving the information from CU 64a, communicates the information via RRC signaling to MT 62c of IAB network node 16c. MT 62c the communicates the information via RRC signaling to DU 60c for use by IAB network node 16c as described herein. The RRC signaling is illustrates in FIG. 12 via a dashed line. Therefore, in one or more embodiments, a parent IAB network node 16a is configured to communicate information such as information indicating a time offset to a downstream IAB network node 16 via RRC signaling.

Other information may be exchanged among the IAB network nodes 16 using the RRC signaling in accordance with the teachings of the present disclosure. RRC signaling as described herein may also be referred to as RRC based information exchange. In one or more embodiments, one or more of DU 60, MT 62 and CU 64 may be implemented and/or provided by one or more of processing circuitry 38, communication interface 30, timing offset unit 26, indication unit 24, etc.

Figure 13:
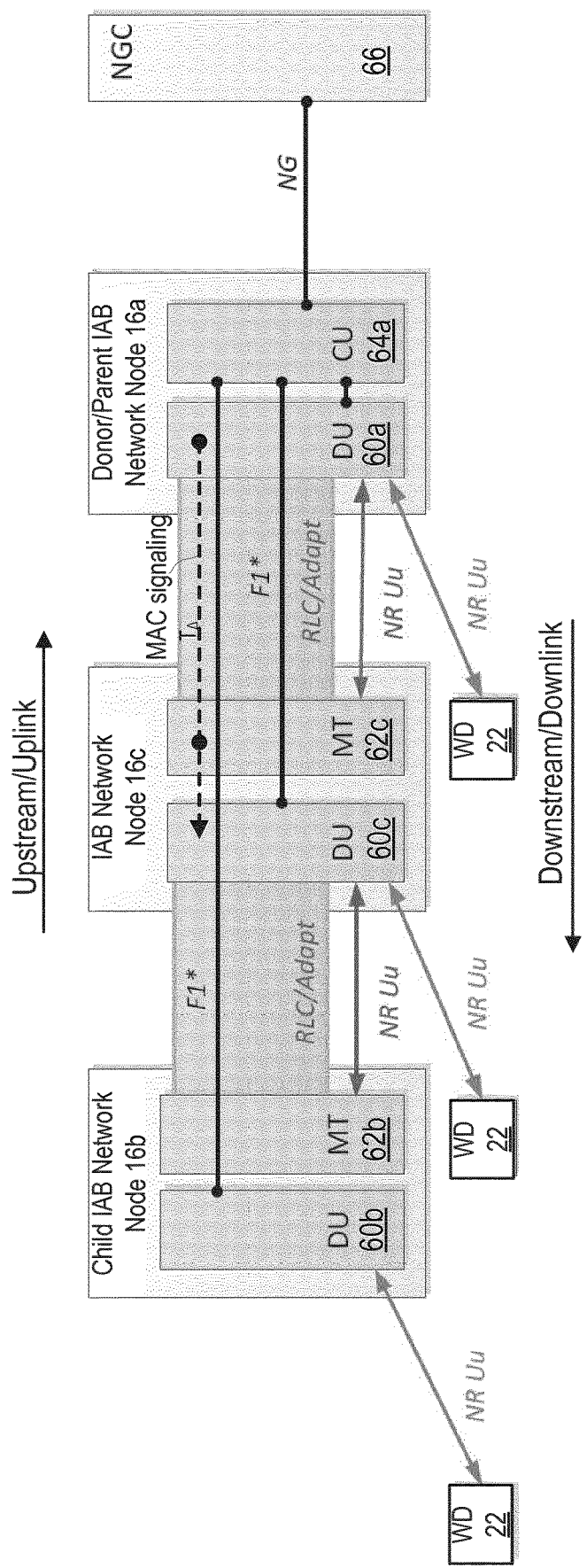
FIG. 13 is a diagram of exemplary MAC signaling according to some embodiments of the present disclosure.

FIG. 13 is a diagram of example MAC signaling for communicating information such as a time offset $T_A$ from a parent IAB network node 16a to IAB network node 16c according to some embodiments of the present disclosure. In particular, the general logical and/or physical components in FIG. 13 corresponds to the components described in FIG. 12. However, in FIG. 13, one or more IAB network nodes 16 have been configured to communicate information such as information indicating a time offset $T_A$ via MAC signaling. For example, DU 60a of parent IAB network node 16a is configured to communicate/transmit information such as information indicating a time offset $T_A$ to MT 62c of IAB network node 16c. MT 62c may then communicate/transmit the information to DU 60c of IAB network node 16c for use by IAB network node 16c as described herein. Other information may be exchanged among the IAB network nodes 16 using the MAC signaling in accordance with the teachings of the present disclosure. MAC signaling as described herein may also be referred to as MAC based information exchange.

Further, while the MAC signaling described herein may be faster or communicate the information in less time than RRC signaling (described with respect to FIG. 12), the RRC signaling may be more robust (e.g. more reliable or secure) than the MAC signaling. Therefore, the teachings described herein advantageously provide one or more new schemes for communicating/transmitting/receiving information such as information indicating a time offset to/from IAB network nodes 16.

Some Example embodiments will now be listed:

Example A1. An IAB network node 16 configured to communicate with a wireless device 22 (WD 22), the IAB network node 16 configured to, and/or comprising a radio interface 32 and/or comprising processing circuitry 38 configured to:
- receive information indicating a timing offset ($T'_A$);
- determine transmission timing for downlink transmission based on the timing offset ($T'_A$) and at least one estimated timing value; and
- perform downlink transmission based on the determined transmission timing.

Example A2. The IAB network node 16 of Example A1, wherein the at least one estimated timing value includes an estimate of a timing difference ($T_A$) between downlink transmissions received by the IAB network node 16 and uplink transmission transmitted by the IAB network node 16.

Example A3. The IAB network node 16 of Example A1, wherein the at least one estimated timing value includes an estimate of a reception timing of a downlink backhaul link from a parent IAB network node 16.

Example B1. A method implemented in an IAB network node 16, the method comprising:

receiving (Block S102) information indicating a timing offset (T'$_A$);

determining (Block S104) transmission timing for downlink transmission based on the timing offset (T'A) and at least one estimated timing value; and performing (Block S106) downlink transmission based on the determined transmission timing.

Example B2. The method of Example B1, wherein the at least one estimated timing value includes an estimate of a timing difference (T$_A$) between downlink transmissions received by the IAB network node 16 and uplink transmission transmitted by the IAB network node 16.

Example B3. The method of Example B 1, wherein the at least one estimated timing value includes an estimate of a reception timing of a downlink backhaul link from a parent IAB network node 16.

Example C1. A wireless device 22 (WD 22), the WD 22 configured to, and/or comprising a radio interface 32 and/or processing circuitry 38 configured to:

communicate information indicating a timing offset (T'$_A$) for determining transmission timing based on the timing offset (T'$_A$) and at least one estimated timing value.

Example C2. The WD 22 of Example C1, wherein the at least one estimated timing value includes an estimate of a timing different (T$_A$) between downlink transmissions received by the IAB network node 16 and uplink transmission transmitted by the IAB network node 16.

Example C3. The WD 22 of Example C1, wherein the at least one estimated timing value includes an estimate of a reception timing of a downlink backhaul link from a parent IAB network node 16.

Example D1. A method implemented in a wireless device 22 (WD 22), the method comprising communicating information indicating a timing offset (T'$_A$) for determining transmission timing based on the timing offset (T'$_A$) and at least one estimated timing value.

Example D2. The method of Example D1, wherein the at least one estimated timing value includes an estimate of a timing different (T$_A$) between downlink transmissions received by the IAB network node 16 and uplink transmission transmitted by the IAB network node 16.

Example D3. The method of Example D1, wherein the at least one estimated timing value includes an estimate of a reception timing of a downlink backhaul link from a parent IAB network node 16.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An integrated access backhaul, IAB, network node comprising processing circuitry configured to:
   receive information indicating a timing offset, $T_A$;
   determine transmission timing for downlink transmission based at least in part on a reception timing estimate of downlink transmission from a parent network node, $T_{P,DL,RX}$, the timing offset, $T_A$, and an estimate of a timing difference, $T_\Delta$, between downlink transmissions received by the IAB network node and uplink transmission transmitted by the IAB network node, the determined transmission timing for downlink transmission is equal to:

$T_{P,DL,RX} - (T_A - T_\Delta)/2$; and perform downlink transmission using the determined transmission timing.

2. The IAB network node of claim 1, wherein the processing circuitry is configured to determine the transmission timing for the downlink transmission further based on an estimate of a reception timing of a downlink backhaul link from a parent IAB network node.

3. The IAB network node of claim 1, wherein the processing circuitry is configured to receive the information indicating the timing offset via Radio Resource Control, RRC, signaling.

4. The IAB network node of claim 1, wherein the processing circuitry is configured to receive the information indicating the timing offset via Medium Access Control, MAC, signaling.

5. The IAB network node of claim 1, wherein the processing circuitry is configured to receive the information indicating the timing offset via one of:
   broadcast signaling; and
   network node specific signaling.

6. The IAB network node of claim 1, wherein the timing offset, $T_A$, is based at least in part on an offset, at the parent network node, between a downlink transmission to the IAB network node and uplink reception from the IAB network node.

7. The IAB network node of claim 6, wherein the processing circuitry is configured to receive the information indicating the timing offset provided from a parent IAB network node.

8. A method implemented by an integrated access backhaul (IAB) network node, the method comprising:
   receiving information indicating a timing offset, $T_A$;
   determining transmission timing for downlink transmission based at least in part on a reception timing estimate of downlink transmission from a parent network node, $T_{P,DL,RX}$, the timing offset, $T_A$, and an estimate of a timing difference, $T_\Delta$, between downlink transmissions received by the IAB network node and uplink transmission transmitted by the IAB network node, the determined transmission timing for downlink transmission is equal to:

$T_{P,DL,RX} - (T_A - T_\Delta)/2$; and performing downlink transmission using the determined transmission timing.

9. The method of claim 8, wherein the method comprises determining the transmission timing for the downlink transmission further based on an estimate of a reception timing of a downlink backhaul link from a parent IAB network node.

10. The method of claim 8, further comprising receiving the information indicating the timing offset via Radio Resource Control, RRC, signaling.

11. The method of claim 8, further comprising receiving the information indicating the timing offset via Medium Access Control, MAC, signaling.

12. The method of claim 8, further comprising receiving the information indicating the timing offset via one of:
    broadcast signaling; and
    network node specific signaling.

13. The method of claim 8, wherein the timing offset, $T_A$, is based at least in part on an offset, at the parent IAB network node, between a downlink transmission to the IAB network node and uplink reception from the IAB network node.

14. The method of claim 13, further comprising receiving the information indicating the timing offset provided from a parent IAB network node.

15. A non-transitory computer readable medium including instructions which, when executed by a processor of an integrated access backhaul, IAB, network node, cause the processor to:
    receive information indicating a timing offset, $T_A$;
    determine transmission timing for downlink transmission based at least in part on a reception timing estimate of downlink transmission from a parent network node, $T_{P,DL,RX}$, the timing offset, $T_A$, and an estimate of a timing difference, $T_\Delta$, between downlink transmissions received by the IAB network node and uplink transmission transmitted by the IAB network node, the determined transmission timing for downlink transmission is equal to:

$T_{P,DL,RX} - (T_A - T_\Delta)/2$; and perform downlink transmission using the determined transmission timing.

16. The non-transitory computer readable medium of claim 15, wherein the information indicating the timing offset is received via one of Radio Resource Control, RRC, signaling and Medium Access Control, MAC, signaling.

17. A communication network comprising a parent integrated access backhaul, IAB, node and an integrated access backhaul, IAB, network node;
    the parent IAB node comprising first processing circuitry configured to:
      determine a timing offset value, $T_A$; and
      communicate information indicating the timing offset value to the IAB network node;
    the IAB network node comprising second processing circuitry configured to:
      receive information indicating the timing offset, $T_A$;
      determine transmission timing for downlink transmission based at least in part on a reception timing estimate of downlink transmission from a parent network node, $T_{P,DL,RX}$, the timing offset, $T_\Delta$, and an estimate of a timing difference, $T_A$, between downlink transmissions received by the IAB network node and uplink transmission transmitted by the IAB network node, the determined transmission timing for downlink transmission is equal to:

$T_{P,DL,RX} - (T_A - T_\Delta)/2$; and perform downlink transmission using the determined transmission timing.

* * * * *